US006471893B1

(12) United States Patent
Hsu

(10) Patent No.: US 6,471,893 B1
(45) Date of Patent: Oct. 29, 2002

(54) METHOD FOR MAKING A RETROREFLECTIVE PLATE AND A PIN UNIT FOR MAKING SAID RETROREFLECTIVE PLATE

(75) Inventor: Chen-Hsun Hsu, Chu-Pei (TW)

(73) Assignee: Hubblevision, Co. Ltd., Hsinchu (CN)

( * ) Notice: Subject to any disclaimer, the term of this patent is extended or adjusted under 35 U.S.C. 154(b) by 0 days.

(21) Appl. No.: 09/568,008

(22) Filed: May 10, 2000

(30) Foreign Application Priority Data

Jul. 16, 1999 (TW) ........................................ 88112097 A

(51) Int. Cl.⁷ .............................................. B29D 11/00
(52) U.S. Cl. ........................... 264/2.5; 264/1.9; 425/808
(58) Field of Search ........................... 264/1.9, 2.5, 1.1; 425/808

(56) References Cited

U.S. PATENT DOCUMENTS

| | | | | |
|---|---|---|---|---|
| 3,657,045 A | * | 4/1972 | Brudy | 156/296 |
| 3,811,647 A | * | 5/1974 | Pink | 425/808 |
| 5,456,864 A | * | 10/1995 | Wickes et al. | 264/2.5 |
| 5,512,219 A | * | 4/1996 | Rowland et al. | 264/1.9 |
| 5,565,221 A | * | 10/1996 | Caroli | 425/808 |

* cited by examiner

Primary Examiner—Mathieu D. Vargot
(74) Attorney, Agent, or Firm—Ladas & Parry

(57) ABSTRACT

This invention primarily relates to a method for making a retroreflective plate including the steps of: (a) making a plurality of pin units by injection molding wherein the pin units substantially include a relatively thicker portion and a relatively thinner portion which is connected to the relatively thicker portion from the bottom thereof along the longitudinal direction of the pin units, the free end of the relatively thicker portion away from the relatively thinner portion forms a tapered portion; (b) placing the pin units on a base, wherein the base has a top surface and a plurality of recessions thereon such that the relatively thinner portion of the pin units can be put into at least some of the recessions for positioning; (c) producing a master negative die with the construction thereof complementary to the tapered portion of the arranged pin units; and (d) using the master negative die to form a retroreflective plate with the construction thereof complementary to that of the master negative die. This invention can significantly reduce the manufacture time and costs of the retroreflective plates. In addition, the retroreflective plates with different patterns and functions can be made in a more precise and convenient manner.

11 Claims, 3 Drawing Sheets

METHOD FOR MAKING A RETROREFLECTIVE PLATE AND A PIN UNIT FOR MAKING SAID RETROREFLECTIVE PLATE

FIELD OF INVENTION

This invention is related to a method for making a retroreflective plate and a pin unit for making said retroreflective plate, and particularly to a utilization of injection molding method for making a plurality of pin units. The pin units are placed on a base and a master negative die having complementary construction to the shape of the pin units is formed by electroforming. The master negative die is then used for making a retroreflective plate with the construction thereof complementary to that of the master negative die. The present invention significantly reduces the manufacture costs and time of retroreflective plates. In addition, the retroreflective plates with different patterns and functions can be made in a more precise and convenient manner.

BACKGROUND OF INVENTION

Retroreflective plates are widely employed for a variety of safety and decorative purposes, and are particularly useful when the need for night time visibility is important under conditions of low ambient light. In most of the retroreflective plates, the light rays impinging upon the front surface of the plates are returned towards the light source in a substantially parallel path. In some other retroreflective plates, the reflected light can be diverged so as to be observed in a wider range by slightly modifying the reflection angle. The retroreflective plates can be used on road warning signs or the light reflector on various vehicles to achieve the decorative and safety purposes.

The conventional method for making the retroreflective plate needs to produce a plurality of metallic pin units (10), as shown in FIG. 1, by precision machining. The pin units (10) are arranged in good order (as shown in FIG. 2) and are clamped together as a bundle by a clamp or other fastening devices. A master negative die (15), as illustrated in FIG. 3, of metallic or other appropriate materials is formed in accordance with the surfaces of the bundle of the pin units (10) by electroforming. The construction of the master negative die (15) is complementary to that of the bundle of the pin units (10). A retroreflective plate (16), as shown in FIG. 4, made of a transparent thermoplastic material or other suitable materials can be formed in cooperation with the master negative die (15). The outer surface (18) of the retroreflective plate (16) is generally a flat plane while the inner side of the retroreflective plate (16) forms a plurality of prisms (17) being complementary to the construction of the master negative die (15). Therefore, the contour and angle of the prisms (17) are substantially the same with those of the pin units (10). Light coming onto the retroreflective plate (16) from the outer surface (18) thereof can be totally reflected back along the parallel direction.

Persons skilled in the art should be familiar with the principle of total reflection by the retroreflective plate (16). Since the refraction coefficient of the retroreflective plate (16) and the refraction coefficient of the ambient air are different from each other, the incident light from the outer surface (18) onto the retroreflective plate (16) can be totally reflected within the prisms (17), and be sent back through the outer surface (18) into the air, as long as the angle between the incident light and the prisms (17) is properly designed and formed.

It has been understood that the above conventional manufacture process involves several disadvantages as discussed hereinafter. As shown in FIG. 1, the pin unit (10) is in the shape of a hexagonal column (or other configuration) with a sharp tip (12) at one end thereof formed by three inclined faces (11). The three inclined faces (11) are substantially in rectangular shape and are substantially perpendicular with one another. It should be noted that the angles among the inclined faces (11) should be very accurate and the surfaces of the inclined faces (11) must be very smooth and even so as to make the retroreflective plate (16) having a plurality of trihedral prisms (17) with satisfactory reflective effect. As can be seen in FIGS. 2 and 4, the shape of the prism (17) of the retroreflective plate (16) is basically identical with the sharp tip (12) of the pin unit (10). In conventional methods for forming the retroreflective plate (16), the pin unit (10) is made of metallic material and is then individually precisely machined by mechanical apparatus. Hence, the conventional methods for producing the retroreflective plate (16) are very time consuming and the manufacture costs thereof are relatively high. In addition, the precision of the above machining process and the homogeneity among the pin units (10) cannot be easily controlled or maintained and thus, an unsatisfactory pin unit may be formed causing an undesired waste of materials and time.

In the conventional process for making the retroreflective plate (16), the pin units (10) are in the shape of a hexagonal column and are tightly arranged in good order, similar to honeycomb, to produce the master negative die (15). Of course, the arrangement of the pin units will not form a honeycomb structure if they are not in the shape of a hexagonal column but other configurations, such as a rectangular column. FIG. 2 illustrates one of the arrangement manners of the pin units (10), wherein a set of pin units (13) and the other set of pin units (14) are rotated 180° (60° or 300°) from each other along the longitudinal axis thereof. The master negative die (15) (as shown in FIG. 3) and the retroreflective plate (16) (as shown in FIG. 4) formed by the two sets of pin units (13, 14), respectively, will thus have two sets of prisms (17) in different orientations to reflect the light coming from different directions. However, producing such a retroreflective plate (16) with two sets of prisms (17) in different orientations is not limited to the method mentioned above. A similar retroreflective plate (16) can be made by arranging all the pin units (10) in the same orientation to form two identical master negative dies which are cut in half. One half of a die is rotated 180° and combined with the other half of the other die. Nevertheless, there exists in either of the above methods significant difficulty in clamping so many pin units (10) without any relative movement or rotation since there is no connection measure among the pin units (10).

In actual applications, for example serving as the cover for the taillight of vehicle, a light source may be provided within the retroreflective plate (16). Accordingly, a portion of the retroreflective plate (16), as shown in FIG. 4, needs to be flat such that the light cover may not only reflect the light from the exterior environment, but also let the light beam from the light source inside pass through the retroreflective plate (16) and transmit to the exterior environment. One existing method for achieving this function is to form a planar region on each or some of the tips (17') of the prisms (17) at the inner side of the retroreflective plate (16). Therefore, the tip (12) of the conventional pin unit (10) shown in FIG. 1 needs to be cut off or ground out one by one to make the master negative die (15) with flat regions, so as to further produce the retroreflective plate (16) with the shape of the prisms (17) substantially the same with that of the pin units (10). Alternatively, the manufacturer may grind the tip (17') of the prism (17) at the inner side of the retroreflective plate (16) after making the retroreflective plate (16) without flat regions. Evidently, both of the above processes are very time consuming resulting in considerably increased production costs, in addition, the precision and quality of the retroreflective plate (16) is difficult to maintain.

SUMMARY OF THE INVENTION

It is a primary object of this invention to overcome the defects of the conventional art and to provide a method for making a retroreflective plate. The method of this invention can considerably reduce the production costs and time needed to make the retroreflective plate. In addition, the retroflective plates with different patterns and functions can be made in a more precise and convenient manner.

According to the primary object, this invention provides a method for making a retroreflective plate including the steps of: (a) making a plurality of pin units by injection molding wherein the pin units substantially include a relatively thicker portion and a relatively thinner portion connected to the relatively thicker portion from the bottom thereof along the longitudinal direction of the pin units, the relatively thicker portion having a free end which is away from the relatively thinner portion and forms a tapered portion; (b) placing the pin units on a base, wherein the base has a top surface and a plurality of recessions thereon such that the relatively thinner portion of the pin units can be put into at least some of the recessions for positioning; (c) producing a master negative die with the construction thereof complementary to the tapered portion of the arranged pin units; and (d) using the master negative die to form a retroreflective plate with the construction thereof complementary to that of the master negative die.

One of the primary advantages of this invention resides in that the pin units are produced by injection molding. This injection molding process can not only ensure that the tapered portion of the pin unit has a smooth and even surface and an accurate angle, but also overcome the existing drawback of precisely machining each pin unit individually. Therefore, this invention significantly reduces the time and costs required for making the retroreflective plate.

According to another object of this invention, the pin units are placed into the recessions of the base and thus, relative motion or rotation encountered in conventional process is less likely to occur between the pin units when clamping the same.

According to yet another object of this invention, a mold in a different configuration can be used to inject a plurality of pin units each having a flat end thereon so as to form a master negative die having flat regions to further produce a transparent retroreflective plate.

The special features and characteristics of this invention can be further realized by referring to the appended drawings and explanations of the preferred embodiments.

BRIEF DESCRIPTIONS OF DRAWINGS

EXPLANATIONS OF PREFERRED EMBODIMENTS

Figure 5:
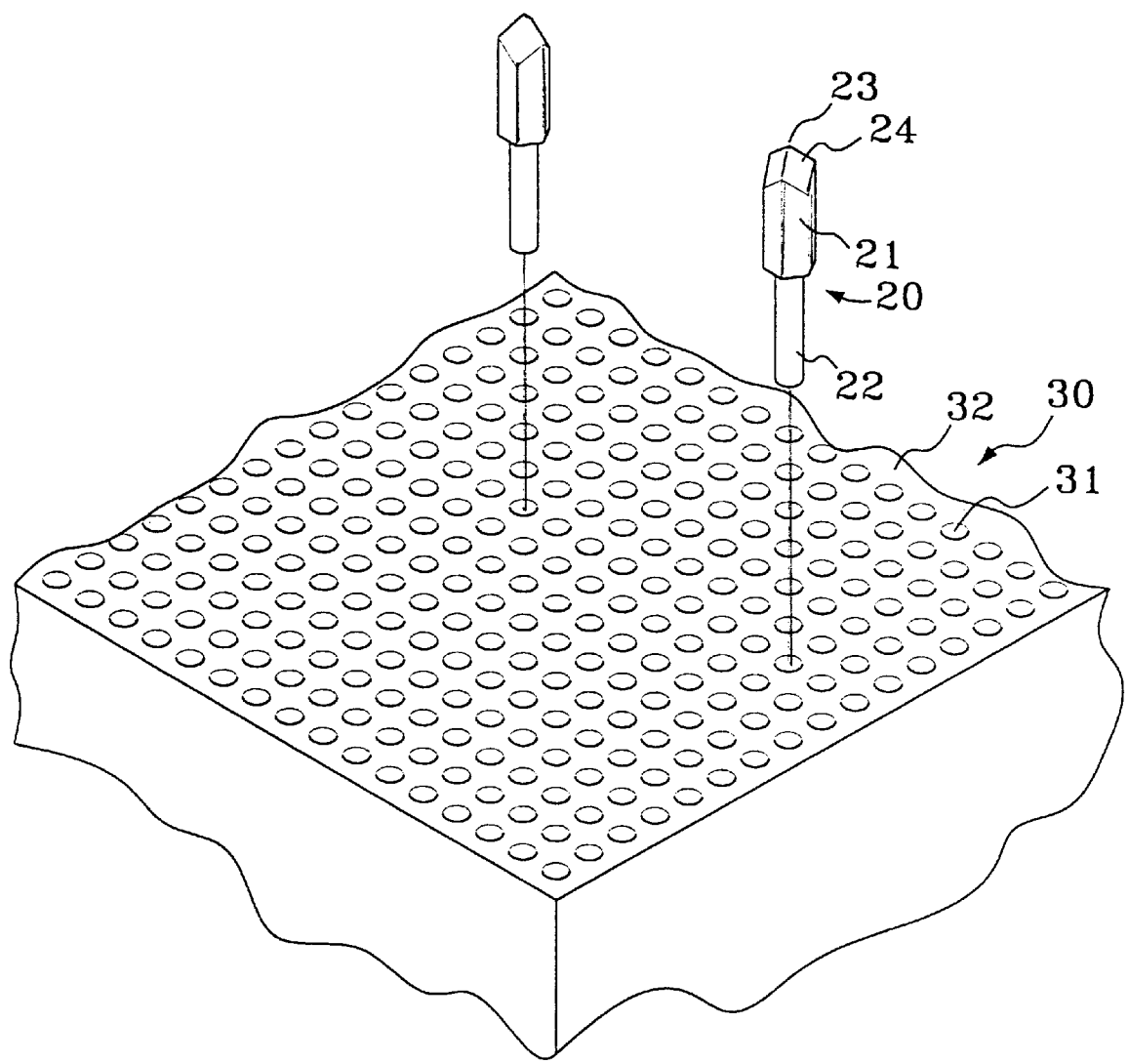
FIG. 5 is a perspective view illustrating a couple of the pin units in combination with the base of the present invention.

This invention is related to a method for making a retroreflective plate and a pin unit for making the retroreflective plate. A pin unit (20), as illustrated in FIG. 5, is made by injection molding of thermoplastic material. The pin unit (20) comprises a relatively thicker portion (21) in the shape of a hexagonal column with the free end thereof forming a tapered portion (23) and a relatively thinner portion (22). In this preferred embodiment, the tapered portion (23) is a sharp tip in the shape of a trihedral prism formed by three rectangular inclined faces (24) which are substantially perpendicular with one another. The relatively thinner portion (22) is in the shape of a cylinder. However, the construction of the pin unit (20) shown in FIG. 5 is only an illustration of a preferred embodiment instead of a limitation to the present invention and can be shaped into other construction. For example, the relatively thicker portion (21) can be in the shape of a rectangular column or other configurations while the relatively thinner portion (22) can also be in the shape of a rectangular column or any other appropriate configurations. Forming the pin unit (20) by the injection molding method can eliminate complicated machining processes required in the conventional processes, reduce production time and cost of the pin units, and ensure that the tapered portion (23) has smooth and even surfaces as well as accurate angles, such that the retroreflective plate (16) produced therefrom is capable of achieving the required reflection effectiveness.

This invention further comprises a base (30) as illustrated in FIG. 5 of the preferred embodiment of the invention. The base (30) includes a top surface (32) having a plurality of recessions arranged in good order. As disclosed in the preferred embodiment, the recessions of the base (30) are cylindrical holes (31) and the cylindrical relatively thinner portion (22) of the pin units (20) can be precisely inserted thereinto respectively for a specific pattern as required. As mentioned above, the relatively thinner portion (22) does not need to be in the shape of cylinder but may also be a rectangular column or other configurations. Accordingly, the recessions of the base (30) can be a plurality of grooves (not shown) or other constructions instead of the cylindrical holes (31) shown in FIG. 5, as long as the relatively thinner portions of the pin units can be properly fitted into the recessions of the base such that the pin unit (20) can be supported in a stable condition during arrangement thereof.

In the event that the relatively thinner portion (22) of the pin unit (20) is n the shape of a rectangular column or other configurations instead of a cylinder, an further advantage may be derived therefrom. Although the pin unit (20) of this invention is made by injection molding, it can hardly be formed into an perfectly ideal construction and minor defects may still exist due to the imperfect resultant construction from the injection mold in actual application. If the relatively thinner portion (22) is in the shape of cylinder as shown in FIG. 5, the manufacturer will have difficulty in distinguishing the orientation of the pin units (20) along the longitudinal direction thereof when placing them on the base (30). Accordingly, if the relatively thinner portion (22) is in the form of a non-cylinder, the manufacturer may determine the orientation of the pin unit (20) by means of the relatively thinner portion (22) in association with the three rectangular inclined faces (24) of the tapered portion (23). As a result, the manufacturer is able to place all the pin units (20) on the base (30) in the same orientation and thus, the undesired effect of the retroreflective plate (16) resulted from the minor production errors of the pin unit (20) can be minimized and the retroreflective plate (16) made by this invention will have more consistent reflective effect and quality.

Figure 2:
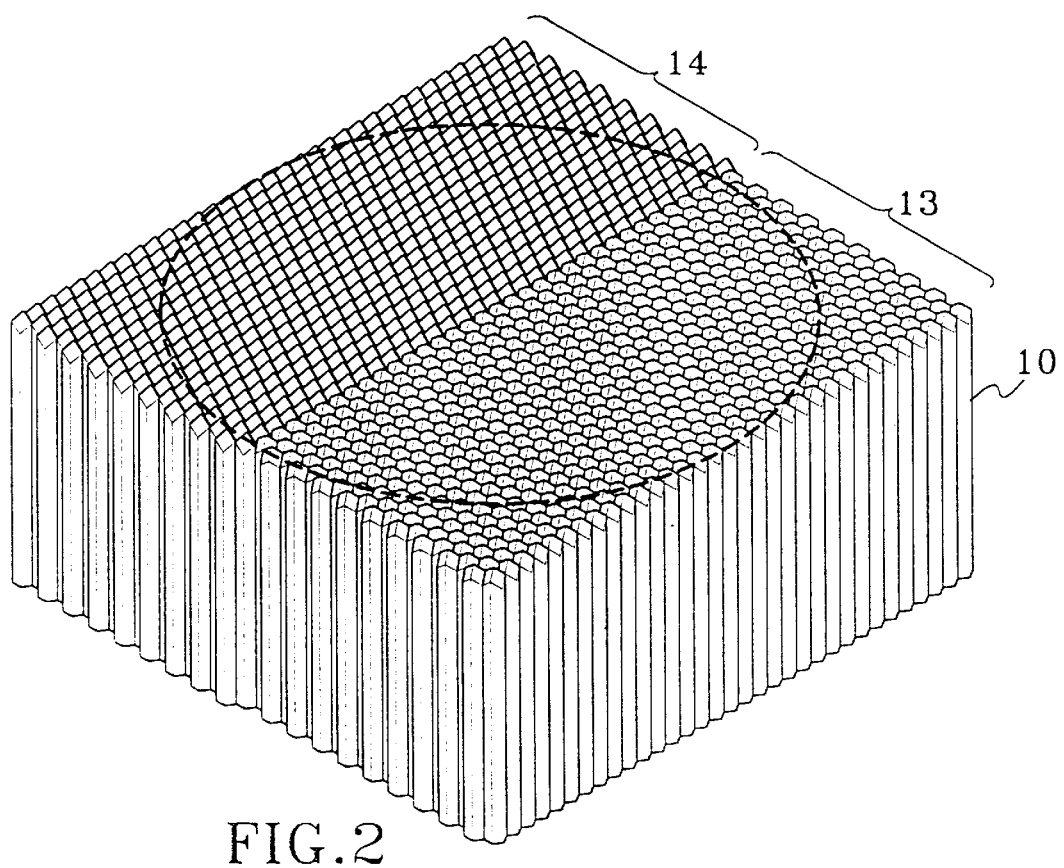
FIG. 2 is a perspective view showing a plurality of pin units arranged in conventional processes for making the retroreflective plate.

After the pin units (20) are placed on the base (30), a clamp (not shown) or other suitable means may be applied to secure all the pin units (20) together to further ensure that there will be no clearance between the pin units (20). Employing the base (30) to support the pin units (20) of this invention makes the arrangement of the pin units (20) much more convenient. Because the pin units (20) can be tightly packed in a honeycomb manner and supported by the base (30), they will be in a more stable condition with less tendency to have relative movement or rotation between the pin units (20) than the conventional arrangement of pin units (10) shown in FIG. 2.

Figure 3:
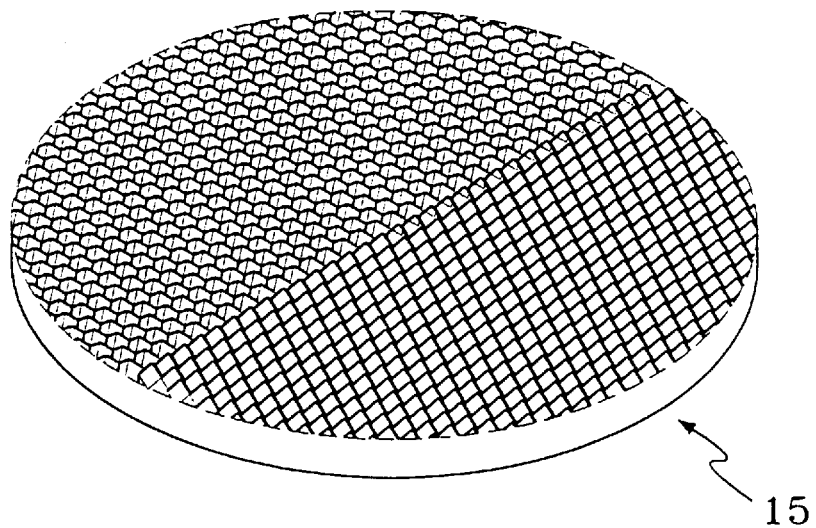
FIG. 3 is a perspective view showing a master negative die.
Figure 4:
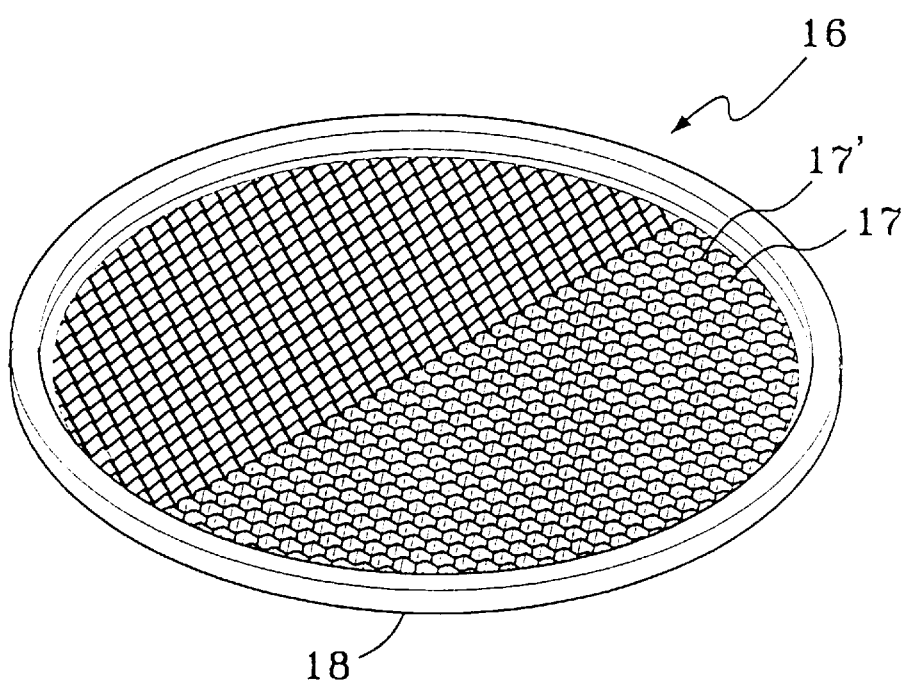
FIG. 4 is a perspective view of the retroreflective plate made from the master negative die of FIG. 3.

The thermoplastic material used for the pin unit (20) may be any appropriate polymeric materials or a conductive polymer. If the selected polymeric material is electrically conductive, the master negative die (15) (as shown in FIG. 3) made of metal or other suitable materials with complementary configuration to the arranged pin units (20) can be directly formed thereon by electroforming or other processes. If the selected polymeric material of the pin unit (20) is not electrically conductive, a thin layer of metal, such as aluminum, silver, copper or nickel etc. needs to be coated on the tapered portion (23) of the pin unit (20) by vacuum evaporation or sputtering prior to electroforming the master negative die (15).

Figure 1:
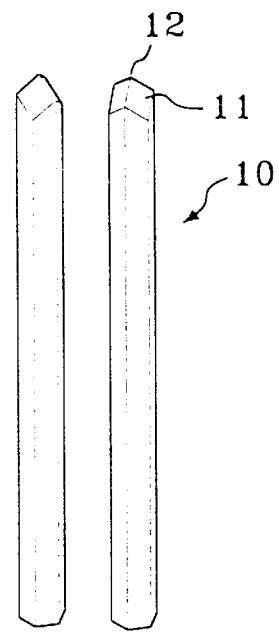
FIG. 1 is a perspective view illustrating a pin unit utilized in conventional processes for making the retroreflective plate.

Persons skilled in the art may consider that the manufacturer only needs to further machine the conventional pin unit (10) shown in FIG. 1 to a construction similar to the pin unit (20) of this invention, that is, a pin unit having a relatively thicker portion and a relatively thinner cylindrical portion, the base (30) can also be applied to form the master negative die (15) according to the process disclosed in this invention. However, it should be noted that each of the conventional pin units (10) must be machined individually under this condition and thus, the production cost and time of the retroreflective plate will be considerably increased. Therefore, utilizing injection molding to make the pin unit (20) of this invention involves various advantages and in particular, lowers the manufacture costs of the retroreflective plate.

Furthermore, a retroreflective plate having flat regions on the prisms such that the light may pass through the retroreflective plate can be easily made by the method of this invention. This invention only requires an injection mold in a different shape so as to form the pin unit with a flat free end on the tapered portion by injection molding, then follows the same steps mentioned above, that is, placing these pin units on the base (30), making a master negative die by electroforming on the pin units, and finally, producing the retroreflective plate from the master negative die. Since the shape of the prism of the retroreflective plate is consistent with the shape of the flat-ended pin unit, the light from a light source inside the retroreflective plate may pass through the flat regions to the exterior surroundings while the light from outside of the retroreflective plate can still be reflected back by the tapered portion of the prism. Consequently, the machining process for the pin units (10) in the conventional method is no longer required and the production time and cost of the retroreflective plate may be significantly reduced.

In actual application, the overall shaping of the retroreflective plate may not be limited to the simple planar configuration as shown in the embodiment described above and may be designed as an inclined or arcuate shape to reflect the light coming from different directions or to become a shape in compliance with the configuration of the articles that the retroreflective plate is attached to. When using the conventional method to produce the retroreflective plate in the shape of an inclined or arcuate shape, it will be quite difficult to arrange a plurality of pin units in an inclined or arcuate manner since they are not properly supported. In contrast, this invention only requires preparing a base having the top surface consistent with the desired shape of the retroreflective plate. As a result, an inclined or arcuate retroreflective plate can be made simply according to the identical steps of above mentioned process of this invention.

This invention is related to a novel method and device that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A method for making a retroreflective plate, comprising the steps of:
    (a) making a plurality of pin units by injection molding wherein the pin units substantially include a relatively thicker portion and a relatively thinner portion connected to the relatively thicker portion from the bottom thereof along the longitudinal direction of the pin units, the relatively thicker portion having a free end which is away from the relatively thinner portion and forms a tapered portion;
    (b) placing the pin units on a base, wherein the base has a top surface and a plurality of recessions thereon such that the relatively thinner portion of the pin units can be put into at least some of the recessions for positioning;
    (c) producing a master negative die with the construction thereof complementary to the tapered portion of the arranged pin units; and
    (d) using the master negative die to form a retroreflective plate with the construction thereof complementary to that of the master negative die.

2. The method for making a retroreflective plate as set forth in claim 1, wherein the pin units are made of a thermoplastic material.

3. The method for making a retroreflective plate as set forth in claim 2, wherein the surfaces of the pin units are coated with a thin layer of metal after the pin units are placed on the base.

4. The method for making a retroreflective plate as set forth in claim 1, wherein the pin units are made of an electrically conductive thermoplastic material.

5. The method for making a retroreflective plate as set forth in claim 1, wherein the master negative die with the construction thereof complementary to the tapered portion of the arranged pin units is produced by electroforming.

6. The method for making a retroreflective piate as set forth in claim 1, wherein the relatively thicker portion of the pin units is in the shape of a hexagonal column or a rectangular column, and the tapered portion of the pin units is in the shape of a trihedral prism formed by three inclined faces which are substantially perpendicular with one another.

7. The method for making a retroreflective plate as set forth in claim 1, wherein the relatively thinner portion of the pin units is in the shape of a cylinder, and the recessions of the base are cylindrical holes such that the relatively thinner portion can be precisely inserted thereinto.

8. The method for making a retroreflective plate as set forth in claim 1, wherein the relatively thinner portion of the pin units is in the shape of a polygonal column, and the recessions of the base are grooves such that the relatively thinner portion can be inserted thereinto.

9. The method for making a retroreflective plate as set forth in claim 1, wherein surfaces of the pin units are coated with a thin layer of metal prior to said step (c).

10. The method for making a retroreflective plate as set forth in claim 9, wherein the surfaces of the pin units are coated with the thin layer of metal after the pin units are placed on the base.

11. The method for making a retroreflective plate as set forth in claim 9, wherein the metal is selected from the group consisting of aluminum, silver, copper and nickel.

\* \* \* \* \*